US011247144B2

United States Patent
Kison et al.

(10) Patent No.: US 11,247,144 B2
(45) Date of Patent: Feb. 15, 2022

(54) VENTED DEGAS BOTTLE FOR MOTOR VEHICLE COOLANT SYSTEM

(71) Applicant: MINIATURE PRECISION COMPONENTS, INC., Walworth, WI (US)

(72) Inventors: Andrew Kison, East Troy, WI (US); Sangbong Ji, Elkhorn, WI (US); William P. Kahabka, Delavan, WI (US)

(73) Assignee: NOVARES US ENGINE COMPONENTS, INC., Walworth, WI (US)

( * ) Notice: Subject to any disclaimer, the term of this patent is extended or adjusted under 35 U.S.C. 154(b) by 593 days.

(21) Appl. No.: 16/120,535

(22) Filed: Sep. 4, 2018

(65) Prior Publication Data

US 2019/0070525 A1 Mar. 7, 2019

Related U.S. Application Data

(60) Provisional application No. 62/554,476, filed on Sep. 5, 2017.

(51) Int. Cl.
*B01D 19/00* (2006.01)
*F01P 11/02* (2006.01)
*B60K 11/02* (2006.01)

(52) U.S. Cl.
CPC ........ *B01D 19/0042* (2013.01); *F01P 11/028* (2013.01); *F01P 11/029* (2013.01); *F01P 11/0285* (2013.01); *B60K 11/02* (2013.01); *F01P 2050/22* (2013.01)

(58) Field of Classification Search
None
See application file for complete search history.

(56) References Cited

U.S. PATENT DOCUMENTS 3,576,181 A * 4/1971 Neal ...................... F01P 11/028
123/41.51
4,247,309 A * 1/1981 Buddenhagen ....... F28F 9/0231
95/261

(Continued)

FOREIGN PATENT DOCUMENTS

EP 1554476 B1 10/2008
WO WO-2017053030 A1 * 3/2017 .......... F01P 11/0285

*Primary Examiner* — Christopher P Jones
*Assistant Examiner* — Phillip Y Shao
(74) *Attorney, Agent, or Firm* — Dickinson Wright PLLC

(57) ABSTRACT

A degas bottle for a motor vehicle coolant system is provided. The degas bottle has a body defining an enclosed cavity bounded by an upper wall, a lower wall and a side wall extending between said upper and lower walls. An inlet extends into an upper region of the cavity proximate the upper wall and an outlet extending outwardly from a lower region of the cavity proximate the lower wall. An interior wall is disposed in the enclosed cavity. The interior wall extends from the upper wall toward the lower wall to a free end spaced from the lower wall. The interior wall has a vent opening proximate the upper wall and extends to the side wall on opposite sides of the inlet. A baffle is disposed between the interior wall and the inlet. The baffle extends from one of the upper wall or the lower wall to a free end spaced from the other of the upper wall or the lower wall.

20 Claims, 3 Drawing Sheets

(56) References Cited

U.S. PATENT DOCUMENTS

| | | | | |
|---|---|---|---|---|
| 6,216,646 B1* | 4/2001 | Smith | ................... | F01P 11/029 123/41.54 |
| 7,717,233 B2* | 5/2010 | Ashida | ................... | F01M 13/04 184/6.13 |
| 2005/0081716 A1* | 4/2005 | Morita | ............... | B01D 19/0042 95/241 |
| 2008/0190385 A1* | 8/2008 | Bangert | ................ | F01P 11/028 123/41.54 |
| 2015/0144079 A1 | 5/2015 | Iafrate | | |
| 2016/0208678 A1* | 7/2016 | Zhang | ................... | F01P 11/029 |
| 2017/0356328 A1* | 12/2017 | Grava | ................... | B21D 51/00 |

* cited by examiner

VENTED DEGAS BOTTLE FOR MOTOR VEHICLE COOLANT SYSTEM

CROSS-REFERENCE TO RELATED APPLICATION

This application claims the benefit of U.S. Provisional Application Ser. No. 62/554,476, filed Sep. 5, 2017, which is incorporated herein by reference in its entirety.

BACKGROUND

1. Field of the Disclosure

The present disclosure relates generally to coolant systems for internal combustion engines, and more particularly to vented degas bottles for motor vehicle coolant systems.

2. Related Art

This section provides background information related to the present disclosure which is not necessarily prior art.

As is well known, coolant systems of most modern motor vehicles having internal combustion engines are intended to remain closed, such that the coolant within the system flows in a continuous closed circuit. It is further known that during use gasses, including air and/or vaporized coolant, can form within the closed system. The presence of gasses within the coolant system is generally undesirable, as gasses tend to reduce the cooling efficiency of the coolant system. The presence of gasses in the coolant system not only affects cooling efficiencies in normal coolant circulation during engine run conditions, but can also impact cooling efficiencies after engine shutdown as a result of the coolant pump shutting down, which can delay engine cooling, and even cause temperature spikes after the engine is turned off. Accordingly, it is desirable to vent gasses formed within the coolant system therefrom prior to their affecting cooling efficiencies. As a result, known modern coolant systems typically include a degas bottle, which, at least in part, is provided to vent gasses from the system. However, degas bottles have proven to have inefficiencies in that gas bubbles can be generated or retained therein, such as via turbulence created by coolant as it enters and flows through the degas bottle. Further yet, known degas bottles can inhibit convective cooling, sometime referred to as thermosiphon cooling, by preventing the inlet of gasses through an inlet of the bottle after engine shutdown, thereby contributing to cooling inefficiencies after shut down, as discussed above.

A degas bottle constructed in accordance with the present disclosure overcomes at least those the problems discussed above, and likely others, which will become readily apparent to one skilled in the art upon viewing the entirety of the disclosure herein.

SUMMARY OF THE DISCLOSURE

This section provides a general summary of the disclosure and is not intended to represent a comprehensive summary of all of its features, advantages, aspect and/or objectives.

It is an aspect of the present disclosure to provide an improved degas bottle that inhibits the formation of air bubbles due to turbulence, that facilitates convective cooling after engine shutdown, and that effectively separates gasses from liquid coolant thereby contributing to proper venting of the gasses from the coolant system.

In accordance with another aspect of the disclosure, a degas bottle for a motor vehicle coolant system is provided having a body defining an enclosed cavity bounded by an upper wall, a lower wall and a side wall extending between said upper and lower walls. The degas bottle further includes an inlet extending into an upper region of the cavity proximate the upper wall for receiving coolant into the enclosed cavity and an outlet extending outwardly from a lower region of the cavity proximate the lower wall for discharging coolant from the enclosed cavity. An interior wall is disposed in the enclosed cavity. The interior wall extends toward the lower wall to a free end spaced from the lower wall. The interior wall separates an inlet chamber from an outlet chamber. A baffle is disposed between the interior wall and the inlet. The baffle extends lengthwise along an axis from one of the upper wall or the lower wall.

In accordance with an aspect of the disclosure, the interior wall may extend from the side wall to separate the inlet chamber from the outlet chamber. In accordance with another aspect of the disclosure, the interior wall may extend from the upper wall.

In accordance with another aspect of the disclosure, the baffle can extend to a free end spaced from the other of the upper wall or the lower wall, opposite the upper wall or the lower wall from which the baffle extends.

In accordance with another aspect of the disclosure, the free end of the baffle can be spaced from the upper wall with the baffle being attached to the lower wall.

In accordance with another aspect of the disclosure, the free end of the baffle can be spaced from the lower wall with the baffle being attached to the upper wall.

In accordance with another aspect of the disclosure, the baffle can be formed being semi-tubular.

In accordance with another aspect of the disclosure, the baffle can be formed being generally C-shaped in cross-section taken along a plane extending transversely to the lengthwise extending axis.

In accordance with another aspect of the disclosure, the baffle can be formed having opposite free edges extending generally parallel to the lengthwise extending axis.

In accordance with another aspect of the disclosure, the inlet may be generally aligned between the opposite free edges of the baffle.

In accordance with another aspect of the disclosure, the opposite free edges of the baffle can be spaced from one another by a gap facing the inlet.

In accordance with another aspect of the disclosure, the baffle may extend across the inlet to ensure the ingress coolant flow from the inlet impinges the baffle.

In accordance with another aspect of the disclosure, the baffle can be spaced in its entirety from the side wall and the interior wall.

In accordance with another aspect of the disclosure, the interior wall can define a vent opening proximate the upper wall.

Further areas of applicability of the present disclosure will become apparent from the description and illustrations provided herein. The description and specific examples in this summary are intended for purposes of illustration only and are not intended to limit the scope of the present disclosure.

BRIEF DESCRIPTION OF THE DRAWINGS

These and other aspects, features and advantages of the disclosure will become more readily appreciated when con

DETAILED DESCRIPTION OF PRESENTLY PREFERRED EMBODIMENTS

Figure 1:
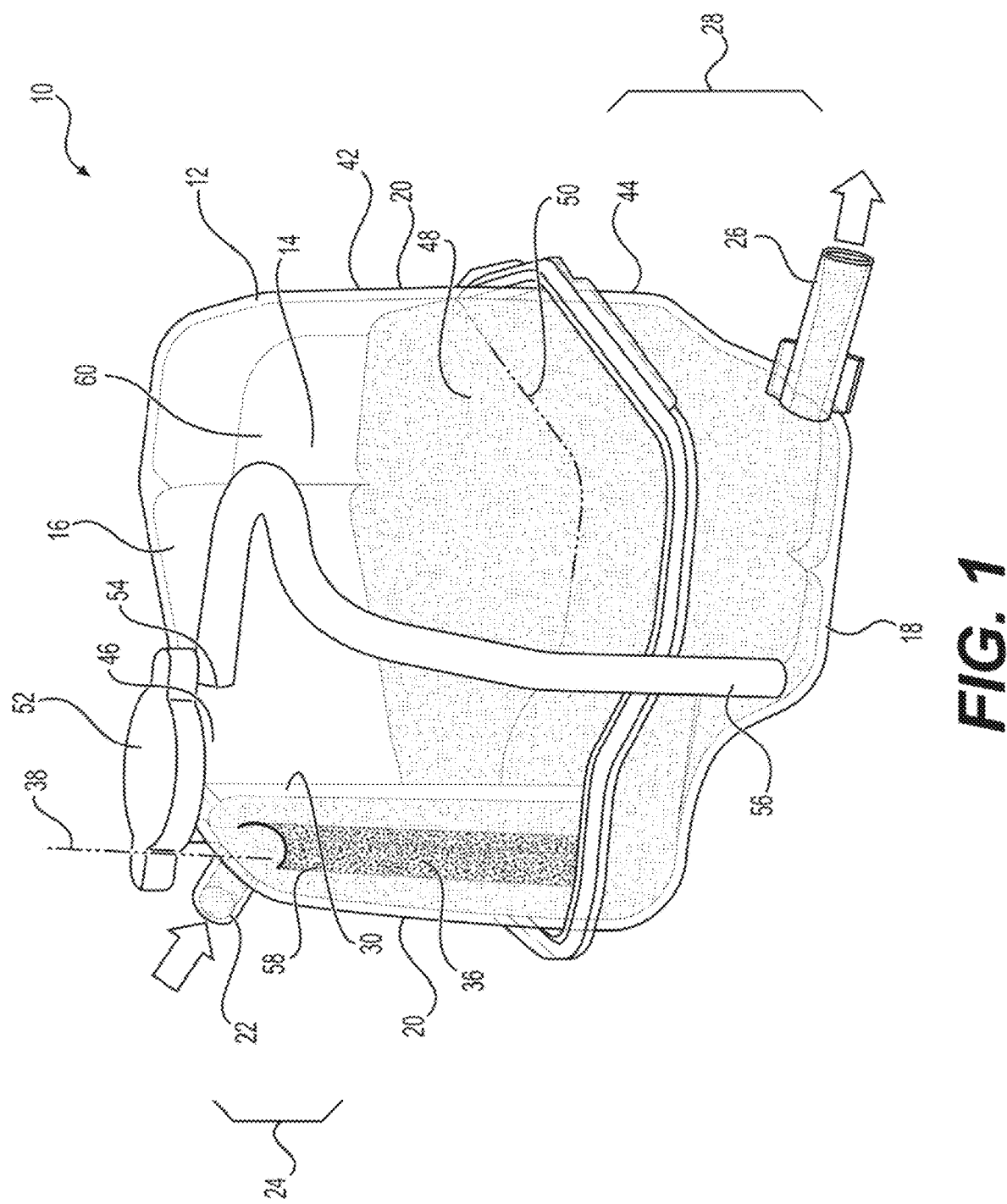
- FIG. 1 is a perspective view of a degas bottle constructed in accordance with one aspect of the disclosure.

Referring in general to all of the Figures, the present disclosure and teachings described herein are directed to degas bottles and to coolant systems of motor vehicles therewith. While disclosed in accordance with one or more specific exemplary constructions, a degas bottle, wherein a first embodiment is identified by reference numeral 10 herein, may be configured other than as expressly shown and described. The inventive concepts disclosed herein are generally directed to an improved degas bottle for facilitating convective heat transfer (thermosiphon cooling) after engine shut down; reducing kinetic energy within the degas bottle that can lead to the formation of air bubbles; enhancing the separation of fluid vapor and gasses from liquid coolant within the degas bottle, and facilitating the venting of gasses from the coolant system during engine run. Accordingly, as least some of the benefits derived from the improved degas bottle include the avoidance of elevated temperatures within the coolant system and internal engine associated therewith; the avoidance inhibiting convective heat transfer after engine shut down, the avoidance of forming turbulence and bubbles therefrom, and the avoidance of entraining gas bubbles into the flow of liquid coolant, among other things that will recognized persons skilled in the art of fluid dynamics and degas bottles.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "compromises," "comprising," "including," and "having," are inclusive and therefore specify the presence of stated features, integers, steps, operations, elements, and/or components, but do not preclude the presence or addition of one or more other features, integers, steps operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below, as would be recognized through use of common sense. The device may be otherwise oriented (rotated 90 degrees or at other orientations) and the spatially relative descriptors used herein interpreted accordingly.

In accordance with one aspect of the disclosure, the degas bottle 10 includes a body 12 defining an enclosed cavity 14 bounded by an upper wall 16, a lower wall 18 and a side wall 20 extending between the upper and lower walls 16, 18. The degas bottle 10 also includes an inlet 22 extending into an upper region 24 of the cavity 14, proximate the upper wall 16 for receiving coolant into the cavity 14. The degas bottle 10 further includes an outlet 26 extending outwardly from a lower region 28 of the cavity 14, proximate the lower wall 18 for discharging coolant from the cavity 14. An interior wall 30 is disposed in the enclosed cavity 14. The interior wall 30 extends from the upper wall 16 toward the lower wall 18 to a free end 32, within the lower region 28, spaced from the lower wall 18. The interior wall 30 has at least one vent opening 34 proximate the upper wall 16, within the upper region 24, and extends to the side wall 20 on opposite sides of the inlet 22. A baffle 36 is disposed between the interior wall 30 and the side wall 20, and in particular, between the interior wall 30 and the inlet 22. The baffle 36 extends lengthwise along an axis 38 from one of the upper wall 16 or the lower wall 18 to a free end 40 spaced from the other of the upper wall 16 or the lower wall 18, such that an air flow gap G is established between the free end 40 and the corresponding upper or lower wall 16, 18.

The body 12 can be formed of any suitable material, such as plastic, by way of example and without limitation, and can further be molded or otherwise formed. In accordance with one aspect, the body 12 can include an upper part 42 and a lower part 44 fixed to one another, such as via a suitable adhesive or weld joint, for example. The upper part 42 is formed having the inlet 22, and can further include a fill opening 46 to allow liquid coolant 48 to be added to the cavity 14 so that the coolant 48 at least reaches a recommended minimum level fill line 50. Upon adding the desired amount of liquid coolant 48, the opening 46 can be sealed via a degas bottle cap, as are known in the art, referred to hereafter as cap 52. The upper part 42 can further include a low pressure vent opening 54, shown as being immediately adjacent the fill opening 46, through which air is permitted to vent from the cavity 14 to the atmosphere via a vent tube 56. The lower part 44 is formed having the outlet 26, and in the non-limiting embodiment illustrated, the outlet 26 is oriented on an opposite side of the body 12 from the inlet 22, and is further located at a lowermost portion of the lower wall 18. Accordingly, liquid coolant 48 within the cavity 14 is assured of flowing to the outlet 26.

The interior wall 30 can have a peripheral shape as desired. The interior wall 30, in combination with a portion of the side wall 20 through which the inlet 22 extends, surround the baffle 36 and bound an inlet chamber 58 into which the coolant flows via the inlet 22. The remaining portion of the cavity 14 outside the inlet chamber 58 forms an outlet chamber 60. The inlet chamber 58 is configured, via the interior wall 30 and vent opening 34 therein and the baffle 36, to separate fluid coolant from vapor/air, thereby ensuring the coolant 48 flow through the outlet 26 is liquid free of vapor/air, thereby maximizing the cooling efficiency of the coolant system. The vent opening 34 in the interior wall 30 is located immediately adjacent the upper wall 16, thereby being reasonably assured of remaining above the level of liquid coolant 48, though no harm exists if liquid coolant 48 passes through the vent opening 34. The purpose of remaining near the upper wall 16 is to ensure that any vapor/air within the inlet chamber 58 is able to flow therethrough such that the vapor/air can be properly vented, such as via the cap 52 and/or vent tube 56. It is to be recognized that a plurality of vent openings 34 could be provided if desired.

Figure 2:
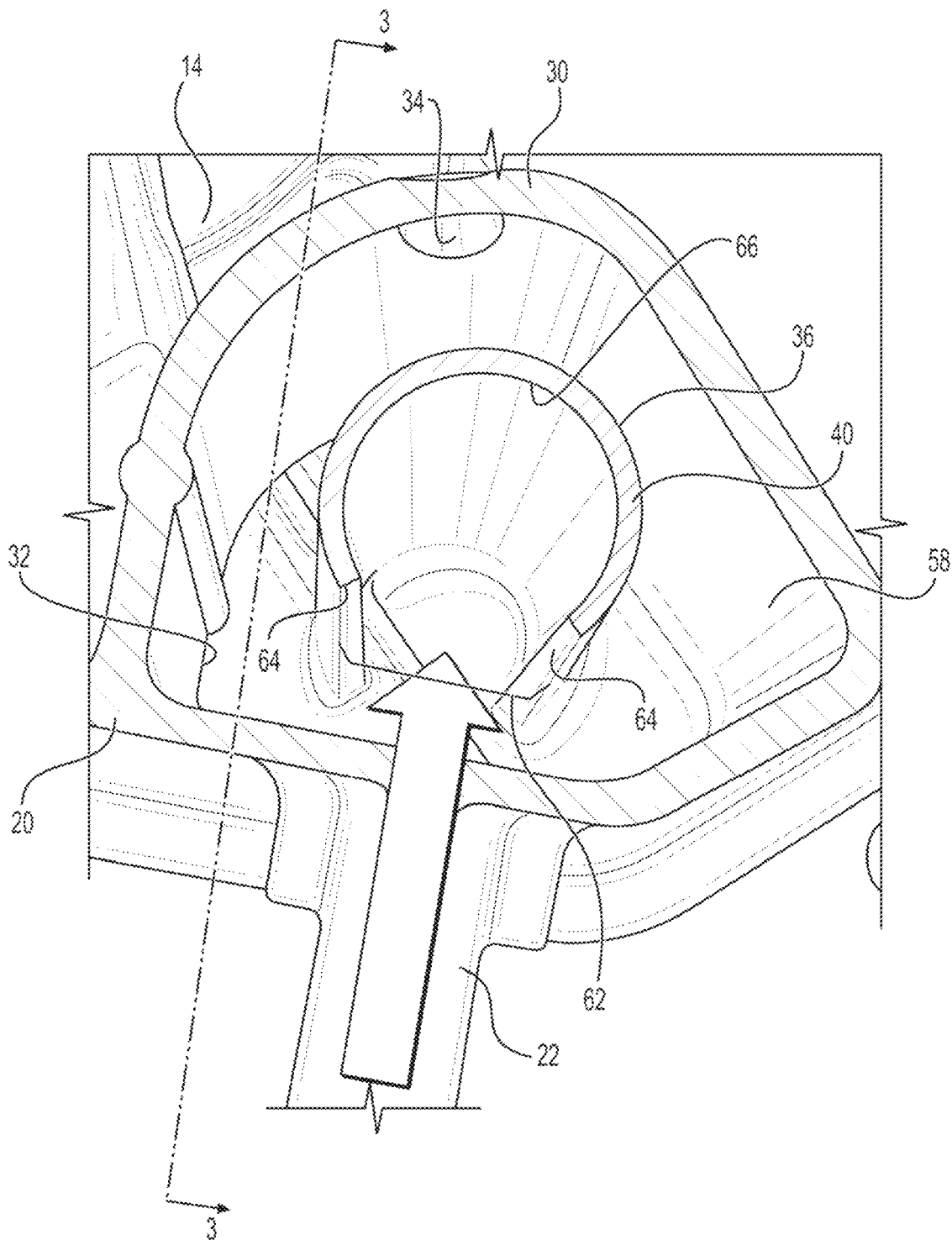
FIG. 2 is a partial top view of the degas bottle of FIG. 1 with a top wall broken away.
Figure 3:
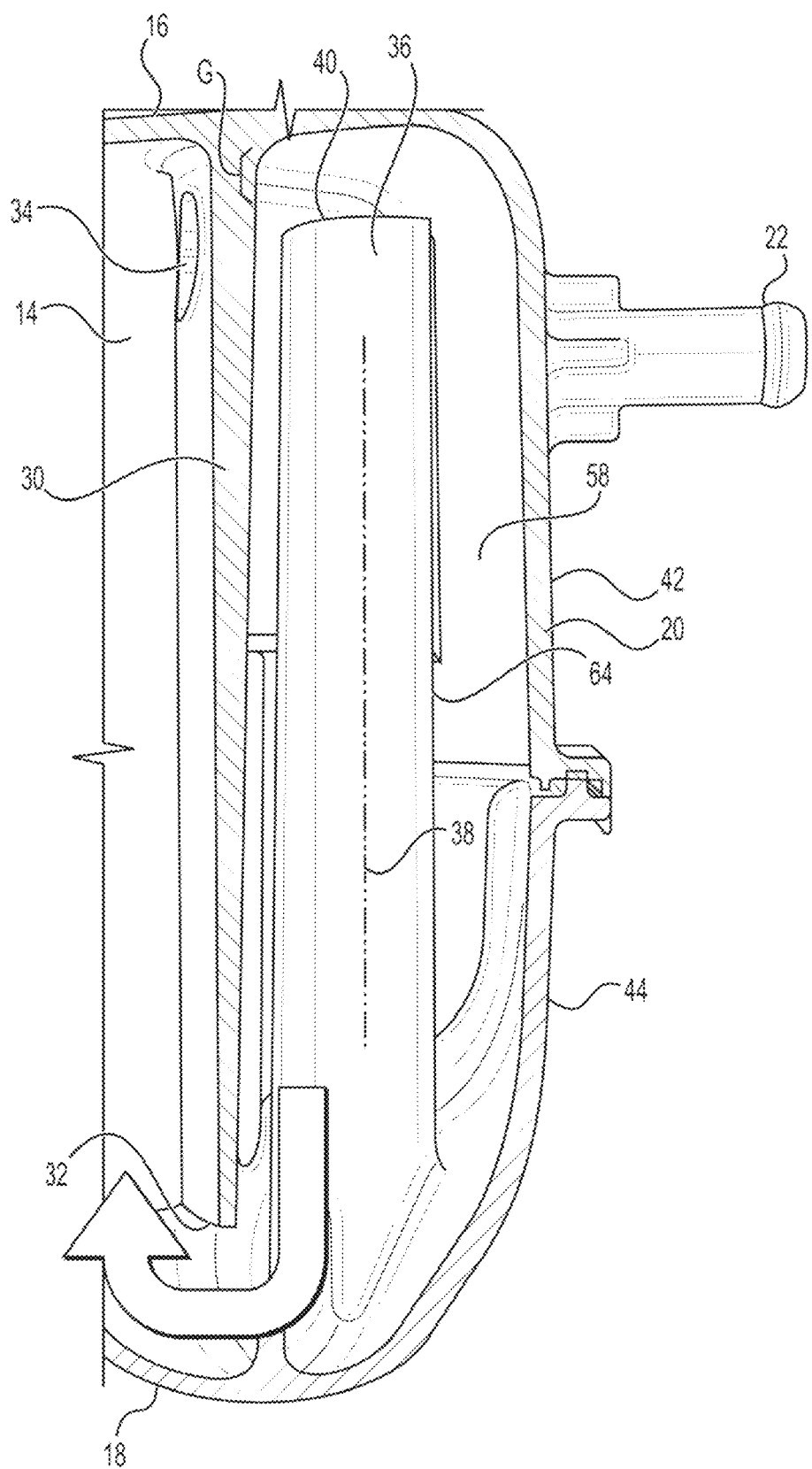
FIG. 3 is a cross-sectional view taken generally along the line 3-3 of FIG. 2

The baffle 36 can be formed having a peripheral shape as desired, and is shown in a non-limiting embodiment as having a generally semi-tubular configuration that is spaced in its entirety from the from the side wall 20 and the interior wall 30. The semi-tubular configuration is defined via a gap 62 established between opposite free edges 64. The semi-tubular configuration is shown, by way of example and without limitation, as being generally C-shaped (FIG. 2) in cross-section taken along a plane extending transversely to the axis 38. The opposite free edges 64 are shown, again by way of example and without limitation, as extending generally parallel to the axis 38. The baffle 36 is position within the inlet chamber 58 so that the inlet 22 is generally aligned between the free edges 64, with the gap 62 directly facing the inlet 22, and thus, the incoming flow through the inlet 22 is assured of flowing through the gap 62 to impinge an inner arcuate or concave surface 66 of the baffle 36. Accordingly, it is to be recognized that the baffle 36, regardless of whether extending from the upper or lower wall 16, 18, and shown in the non-limiting embodiment as extending from the lower wall 18, extends across the inlet 22.

In use, the coolant flow from an internal combustion engine (not shown) enters the inlet chamber 58 of the degas bottle 10 via the inlet 22. The inflow of coolant is directed through the gap 62 and against the inner surface 66 of the baffle 36, whereupon vapor/air contained in the coolant is separated. The liquid coolant 48 falls under the force of gravity to the lower region 28, whereupon the liquid coolant 48 is free to flow beneath the free end 32 of the interior wall 30 to the outlet chamber 60, and eventually exit the outlet 26. Meanwhile, the vapor/air is free to flow over the free end 40 of the baffle 36 and through the vent opening 34 in the interior wall 30, whereupon the vapor/air can eventually be vented via the cap 52 and/or the vent tube 56. As the inflow impinges the baffle 36, air is prevented from being entrained through the vent opening 34 as a result of the baffle 36 being disposed between the vent 34 and the inlet 22, and thus, air is prevented from flowing from the outlet chamber 60 into the inlet chamber 58 through the vent opening 34. As such, the coolant 48 that flows beneath the free end 32 is assured of being free or substantially free (meaning that a negligible amount vapor/air may be present in the coolant) of vapor/air, thereby enhancing the efficiency of the coolant system.

The foregoing description of the embodiments has been provided for purposes of illustration and description. It is not intended to be exhaustive or to limit the disclosure or claims. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure and claims, wherein the claims ultimately define the scope of the invention.

What is claimed is:

1. A degas bottle for a motor vehicle coolant system, comprising:
    a body having an enclosed cavity bounded by an upper wall, a lower wall and a side wall extending between said upper and lower walls;
    an inlet extending into an upper region of said cavity proximate said upper wall for receiving coolant into said enclosed cavity;
    an outlet extending outwardly from a lower region of said cavity proximate said lower wall for discharging coolant from said enclosed cavity;
    an interior wall disposed in said enclosed cavity, said interior wall extending toward said lower wall and having a free end spaced from said lower wall to separate an inlet chamber, into which coolant flows directly from said inlet, from an outlet chamber, from which coolant flows outwardly through said outlet; and
    a baffle disposed in said inlet chamber between said interior wall and said inlet, said baffle extending lengthwise along an axis from one of said upper wall or said lower wall, said baffle being configured so that coolant flowing through said inlet impinges against said baffle and then flows beneath said free end of said interior wall and then through said outlet.

2. The degas bottle of claim 1, wherein said baffle extends to a free end spaced from the other of said upper wall or said lower wall opposite the one of said upper wall or said lower wall from which said baffle extends.

3. The degas bottle of claim 2, wherein said free end of said baffle is spaced from said upper wall.

4. The degas bottle of claim 1, wherein said baffle is semi-tubular.

5. The degas bottle of claim 4, wherein said baffle is generally C-shaped in cross-section taken along a plane extending transversely to said axis.

6. The degas bottle of claim 4, wherein said baffle has opposite free edges extending generally parallel to said axis.

7. The degas bottle of claim 6, wherein said inlet is generally aligned between said opposite free edges.

8. The degas bottle of claim 6, wherein said opposite free edges are spaced from one another by a gap, said gap facing said inlet.

9. The degas bottle of claim 1, wherein said baffle extends across said inlet.

10. The degas bottle of claim 1, wherein said baffle is entirely spaced from said side wall and said interior wall.

11. The degas bottle of claim 1, wherein said interior wall extends from said upper wall; and
wherein said interior wall defines a vent opening proximate said upper wall.

12. A degas bottle for a motor vehicle coolant system, comprising:
a body having an enclosed cavity bounded by an upper wall, a lower wall and a side wall extending between said upper and lower walls;
an inlet extending into an upper region of said cavity proximate said upper wall for receiving coolant into said enclosed cavity;
an outlet extending outwardly from a lower region of said cavity proximate said lower wall for discharging coolant from said enclosed cavity;
an interior wall disposed in said enclosed cavity, said interior wall extending from said upper wall and said side wall toward said lower wall to a free end spaced from said lower wall and separating an inlet chamber from an outlet chamber; and
a baffle disposed in said inlet chamber between said interior wall and said inlet, said baffle being configured so that coolant flowing through said inlet impinges against said baffle and then flows beneath said free end of said interior wall and then through said outlet.

13. The degas bottle of claim 12, wherein said baffle is semi-tubular.

14. The degas bottle of claim 13, wherein said baffle extends lengthwise along an axis between one of said upper wall and said lower wall, and wherein said baffle is generally C-shaped in cross-section taken along a plane extending transversely to said axis.

15. The degas bottle of claim 13, wherein said baffle extends lengthwise along an axis between one of said upper wall and said lower wall, and wherein said baffle has opposite free edges extending generally parallel to said axis.

16. The degas bottle of claim 15, wherein said inlet is generally aligned between said free edges.

17. The degas bottle of claim 15, wherein said free edges are spaced from one another by a gap, said gap facing said inlet.

18. The degas bottle of claim 12, wherein said baffle extends across said inlet.

19. The degas bottle of claim 12, wherein said baffle is entirely spaced from said side wall and said interior wall.

20. The degas bottle of claim 1, wherein said interior wall extends from said side wall of said body.

* * * * *